C. E. THOMAS.
LISTER PLOW.
APPLICATION FILED JAN. 11, 1917. RENEWED SEPT. 13, 1919.

1,335,083.

Patented Mar. 30, 1920.
2 SHEETS—SHEET 1.

WITNESSES
James F. Crown,
Ross J. Woodward.

INVENTOR
Charles E. Thomas,
BY Richard Owen,
ATTORNEY

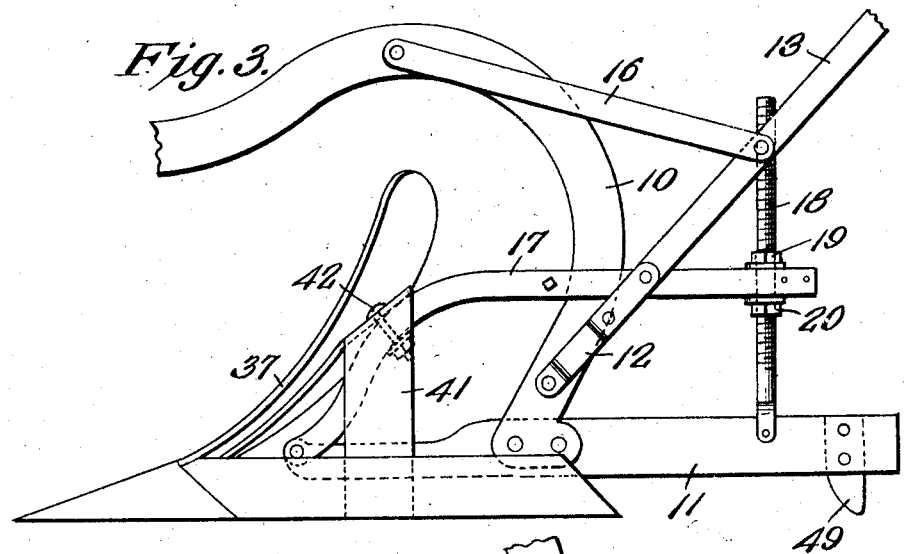
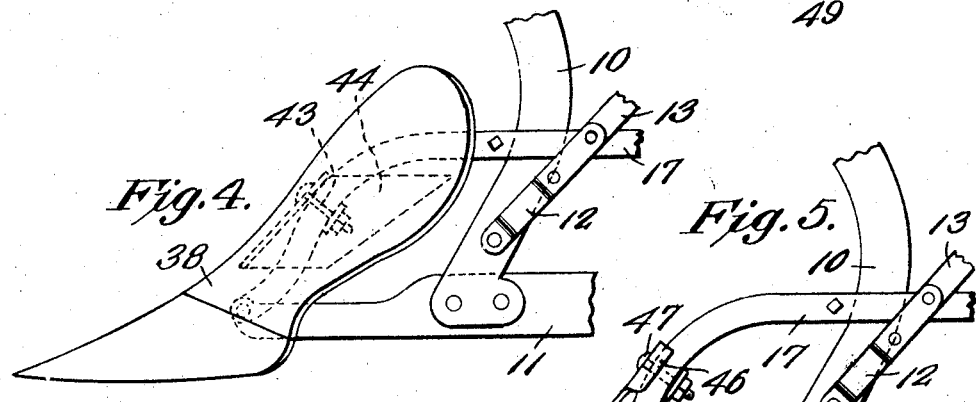
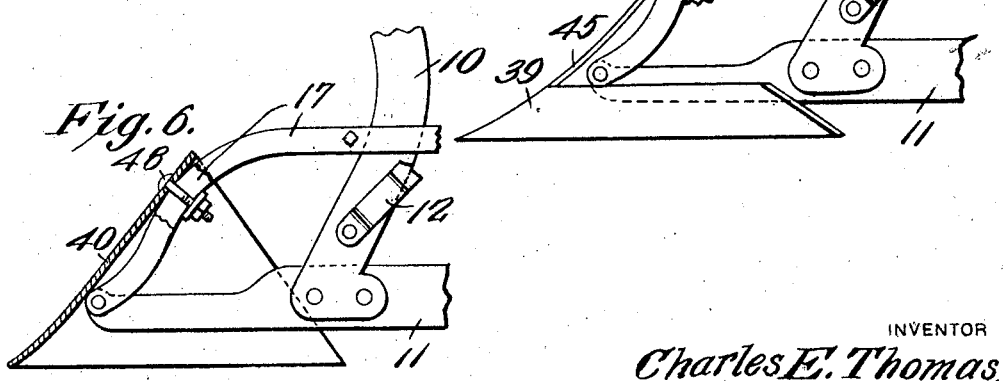

UNITED STATES PATENT OFFICE.

CHARLES E. THOMAS, OF OIL CITY, OKLAHOMA.

LISTER-PLOW.

1,335,083. Specification of Letters Patent. Patented Mar. 30, 1920.

Application filed January 11, 1917, Serial No. 141,850. Renewed September 13, 1919. Serial No. 323,645.

*To all whom it may concern:*

Be it known that I, CHARLES E. THOMAS, a citizen of the United States, residing at Oil City, in the county of Carter and State of Oklahoma, have invented certain new and useful Improvements in Lister-Plows, of which the following is a specification.

This invention relates to an improved plow of the lister type and the principal object of the invention is to provide a plow having an improved type of stock or carriage with which a selected type of plow blade or a cultivator frame may be connected and which is so constructed that the stock or frame may be adjusted to give the proper pitch to the plow blade or cultivator frame.

Another object of the invention is to so construct the cultivator frame that it may be adjusted for width of ground to be covered and to further so mount and construct the blade carrying arms of this cultivator frame that they may be yieldably held in a normal position and permitted to move when excessive resistance is encountered such as when hard spots are cut through or in case stones or other obstructions are encountered.

Another object of the invention is to so construct this plow that the various blades may be easily and quickly put in place or removed and securely held in place and in the proper position when in use.

This invention is illustrated in the accompanying drawings, wherein:—

Fig. 3 is a view in side elevation of the lister plow with one type of plow blade connected therewith.

Figs. 4 and 5 are fragmentary views of the lister plow showing different forms of plow blades connected therewith.

Fig. 6 is a fragmentary view showing a portion of the lister plow in elevation and a plow blade in section.

Figure 1:
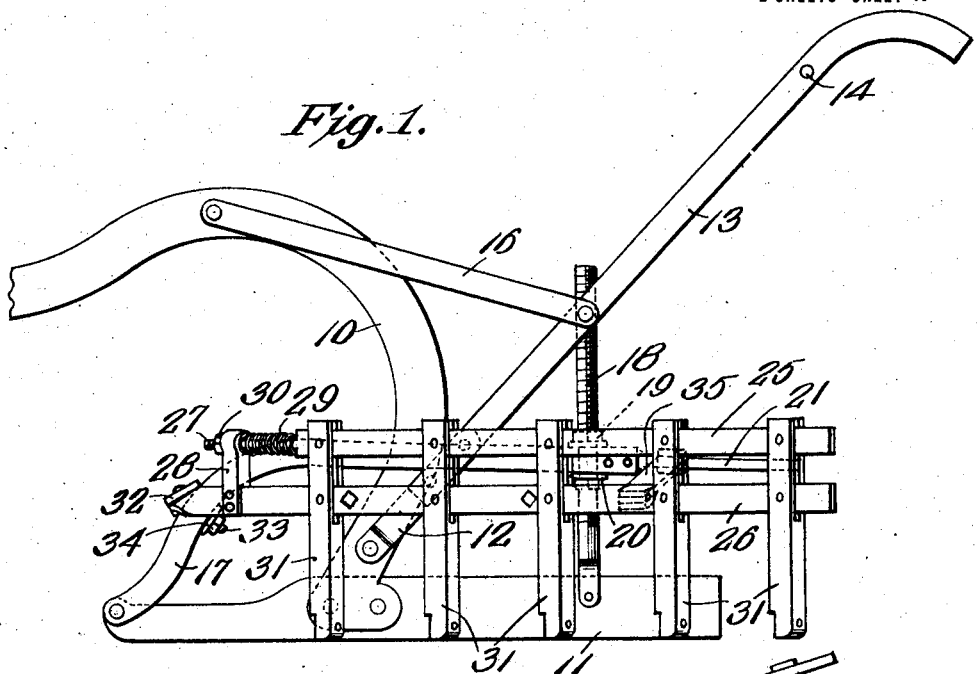
Figure 1 is a view in side elevation of the improved plow with the cultivator frame in place.
Figure 2:
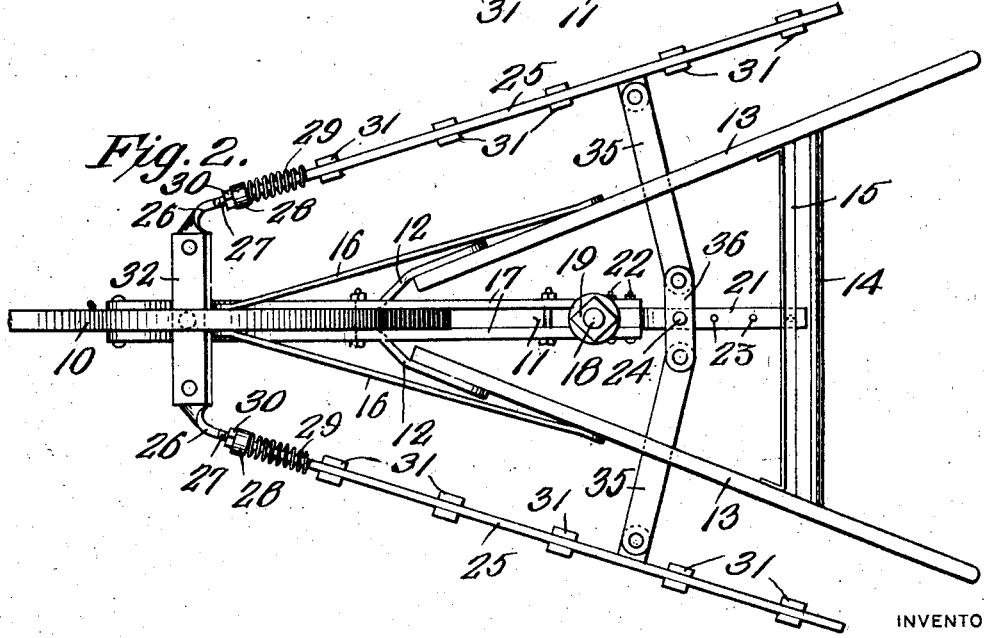
Fig. 2 is a top plan view of the plow with the cultivator frame in place.

The lister plow is provided with a carriage or body including a plow beam 10 which plow beam is connected to the shoe 11 and provided with arms or brackets 12 with which the plow handles 13 are connected. These plow handles 13 are connected by the cross rod 14 and bracing bar 15 and are braced from the plow beam 10 by the side braces 16 thus providing a strong and rigid structure. Lever bars or carrying arms 17 are pivotally connected with the forward end of the shoe 11 and extend rearwardly of the plow upon opposite sides of the plow beam 10 and also upon opposite sides of the adjusting stem 18 which is pivotally connected with the rear portion of the shoe and is threaded and carries upper and lower securing nuts 19 and 20 which will engage the bars and hold the bars against movement longitudinally of the stem. A pin 21 is secured between the rear end portions of the bars 17 by fasteners 22 and is provided with openings 23 through one of which passes a securing key 24 when the cultivator frame is in place.

This cultivator frame is provided with upper and lower side bars 25 and 26, the upper side bars terminating at their forward ends in reduced extensions forming pins 27 which pass through bearings 28 and carry springs 29 held at the proper tension through adjustment of the nuts 30. The standards 31 for carrying cultivator blades are provided with slotted upper end portions through which pass the upper and lower side bars 25 and 26, pins being passed through the standards and upper and lower side bars to pivotally connect the standards with the side bars. It will thus be seen that under normal conditions, the standards will be held in the vertical position shown in Fig. 1 but that when pressure is applied to the lower end portions of the standards, the standards may be swung rearwardly against the tension of the springs 29. A cross head or block 32 is pivotally connected to the forward end of the lower side bar 26 and carries a threaded stem or bolt 33 which extends between the lever bars 17 and is secured by a fastener or nut 34. Links 35 are pivotally connected with the lower side bars and are pivotally connected with a block 36 through which will extend the pin 21 and from an inspection of the drawings it will be readily seen that when the head block 32 is secured and the block 36 moved longitudinally upon the pin 21, the side bars will be moved to spread or contract the cultivator frame. After the cultivator frame has been adjusted to the proper width, the pin 24 will be put in place and the cultivator frame will be held in the proper adjusted position.

In Figs. 3, 4, 5 and 6 there has been shown plow blades indicated by the numerals 37, 38, 39 and 40 which plow blades may be connected with the bars 17. In Fig. 3, this plow blade will be provided with an attaching bracket 41 which engages the upper edge faces of the lever bars 17 and carries a securing bolt 42 passing between the lever arms and secured by a securing nut. The plow blade 38 straddles the lever arm and is provided with a bolt 43 carried by the plate 44 and passing between the lever bars to connect the plow blade with the lever arms. The plow blade 39 includes an arm 45 which engages the lever bars 17 and is provided with side flanges or wings 46 engaging the outer side faces of the lever bars. The bolt 47 is carried by this arm 45 and when in place and tightened, will securely but releasably connect the blade with the lever bars. The plow blade 40 straddles the lever bars 17 and carries a securing bolt 48 which passes between the bars 17 and when tightened holds the blade in the proper position. These plow blades will be put in place and secured at the proper point along the lever bars 17 according to the depth of cut it is desired to make and after the plow blade has been put in place, the securing nuts 19 and 20 will be adjusted upon the stem 18 to give the blade the proper pitch and the plow is then ready for use. The draft animals will be connected with the plow beam 10 and the plow will then be used in the usual manner, the knife 49 carried by the shoe 11 cutting into the furrow and serving to guide the movement of the plow and prevent side play. When used for a cultivator, the cultivator frame will be put in place as previously described and if desired the stem 21 and blade 49 may be removed. It will thus be seen that there has been provided a lister plow which will be very convenient to use and which can be easily converted from one type of plow to another.

What is claimed is:—

1. In an agricultural implement a carrier comprising a shoe, a threaded stem extending from the rear portion of said shoe, lever bars pivotally connected with the forward portion of said shoe and extending upon opposite sides of said threaded stem, securing nuts threaded upon the stem and engaging the upper and lower faces of said lever bars, and earth working means connected with said lever bars.

2. An agricultural implement including a carrier comprising a shoe, a stem extending above the rear portion of said shoe, lever bars pivotally connected with the forward portion of said shoe and extending upon opposite sides of the stem, abutments adjustably mounted upon said stem above and below the lever bars for engaging the lever bars and releasably holding the same in an adjusted position, and earth working means connected with said lever arm.

3. An agricultural machine comprising a carrier including a shoe, lever bars pivotally connected with the shoe, means for vertically adjusting said lever bars, and a cultivator frame comprising upper and lower side bars, a cross head pivotally connected with the lower side bars and provided with a fastener connecting the cross heads with the lever bars, a stem extending from the rear end portions of the lever bars, a cross head adjustably mounted upon said stem, links pivotally connected with the last mentioned cross head and with the rear portions of the lower side arms, bearings carried by the lower side arms, the forward end portions of the upper side arms being reduced and formed into pins extending through the bearings, abutments adjustably mounted upon the forward ends of the pins and engaging said bearings, springs mounted upon said pins and engaging said bearings to yieldably hold the upper arms in a normal position, and standards pivotally connected with the upper and lower side arms.

4. An agricultural implement comprising a carrier including pivotally mounted lever bars and means for vertically adjusting the lever bars, and a cultivator attachment comprising lower side bars, means for pivotally connecting the forward ends of the lower side bars and connecting the forward ends of the side bars with the forward portions of the lever bars, a pin extending from the rear end portions of said lever bars, a cross head adjustably mounted upon the pin, links pivotally connected with the cross head and with the rear portions of the lower side bars, upper side bars slidably connected with the lower side bars and yieldably held in a normal position, and blade carrying standards pivotally connected with the upper and lower side bars.

5. An agricultural implement comprising a carrier including a pivotally mounted supporting structure and a cultivator attachment comprising a set of side bars having their forward ends pivotally connected with the forward portions of the supporting structure, a cross head adjustably connected with the rear end portion of the supporting structure, links pivotally connected with the cross head and with the rear portions of the side bars, a second set of side bars slidably connected with the first set of side bars and yieldably held in a normal position, and blade carrying standards pivotally connected with the sets of side bars.

6. A cultivator attachment for an agricultural implement comprising lower side bars, a cross head pivotally connecting the forward ends of the side bars and provided with a securing stem, upper side bars slidably mounted and yieldably held in a normal position, standards having their upper end portions provided with slots receiving the side bars, the standards being pivotally connected with the upper and lower side bars, links pivotally connected with the rear end portions of the lower side bars, and a cross head pivotally connecting the links and provided with a fastener receiving opening.

7. A cultivator attachment for an agricultural implement comprising lower side bars, means pivotally connecting the forward ends of the lower side bars, means connecting the rear end portions of the lower side bars for holding the side bars in spaced relation, upper side bars slidably mounted and yieldably held against forward movement, and standards pivotally connected with the upper and lower side bars.

In testimony whereof I affix my signature in presence of two witnesses.

CHARLES E. THOMAS.

Witnesses:
ELBERT H. STINNETT,
ALEXANDER J. THOMAS.